Sept. 30, 1969  G. E. PARKER  3,469,397
GAS TURBINE SPEED GOVERNOR WITH ACCELERATION FUEL SCHEDULE
Filed Jan. 12, 1968  3 Sheets-Sheet 1
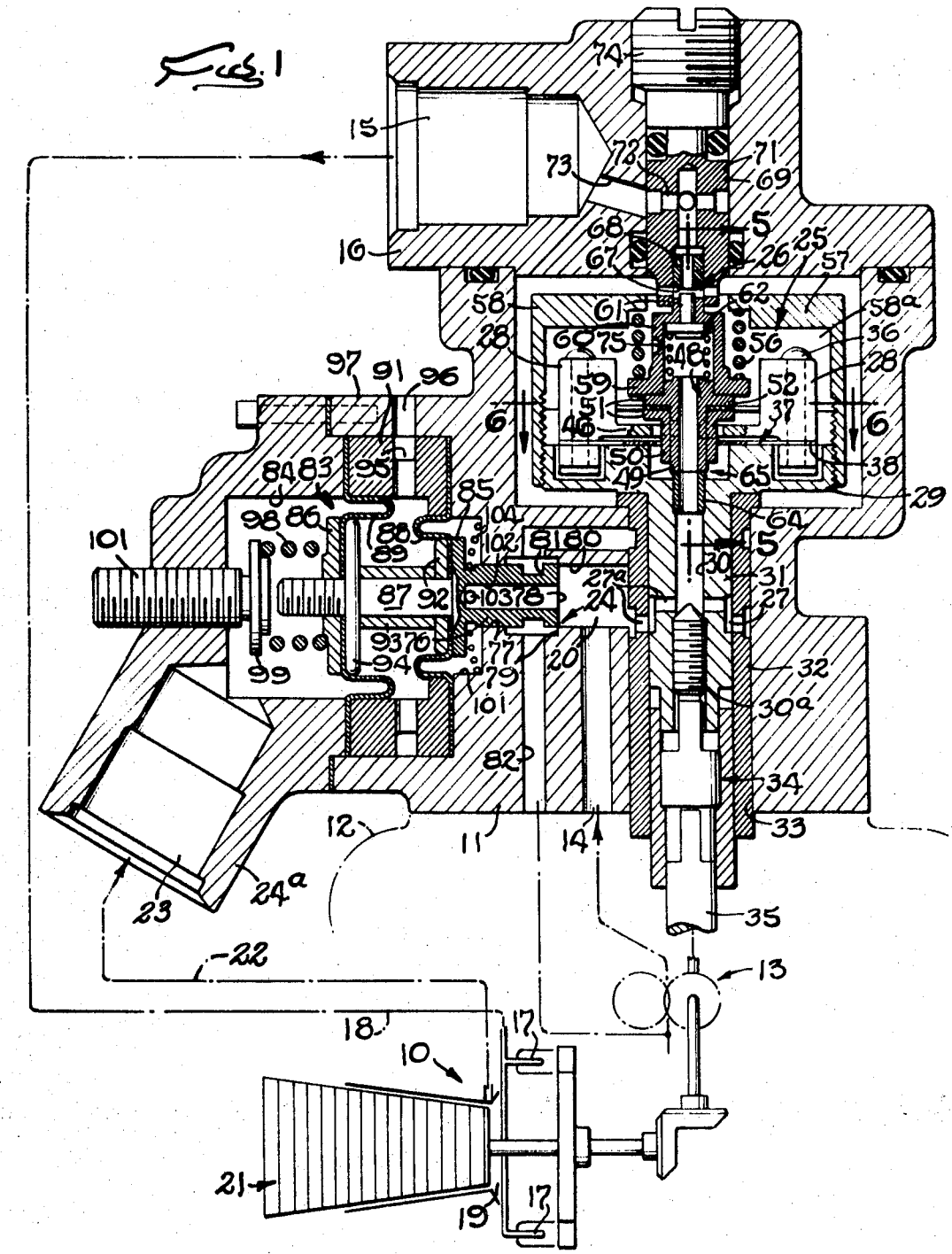
INVENTOR
George E. Parker
By Wolfe, Hubbard, Voit & Osann
ATTORNEYS

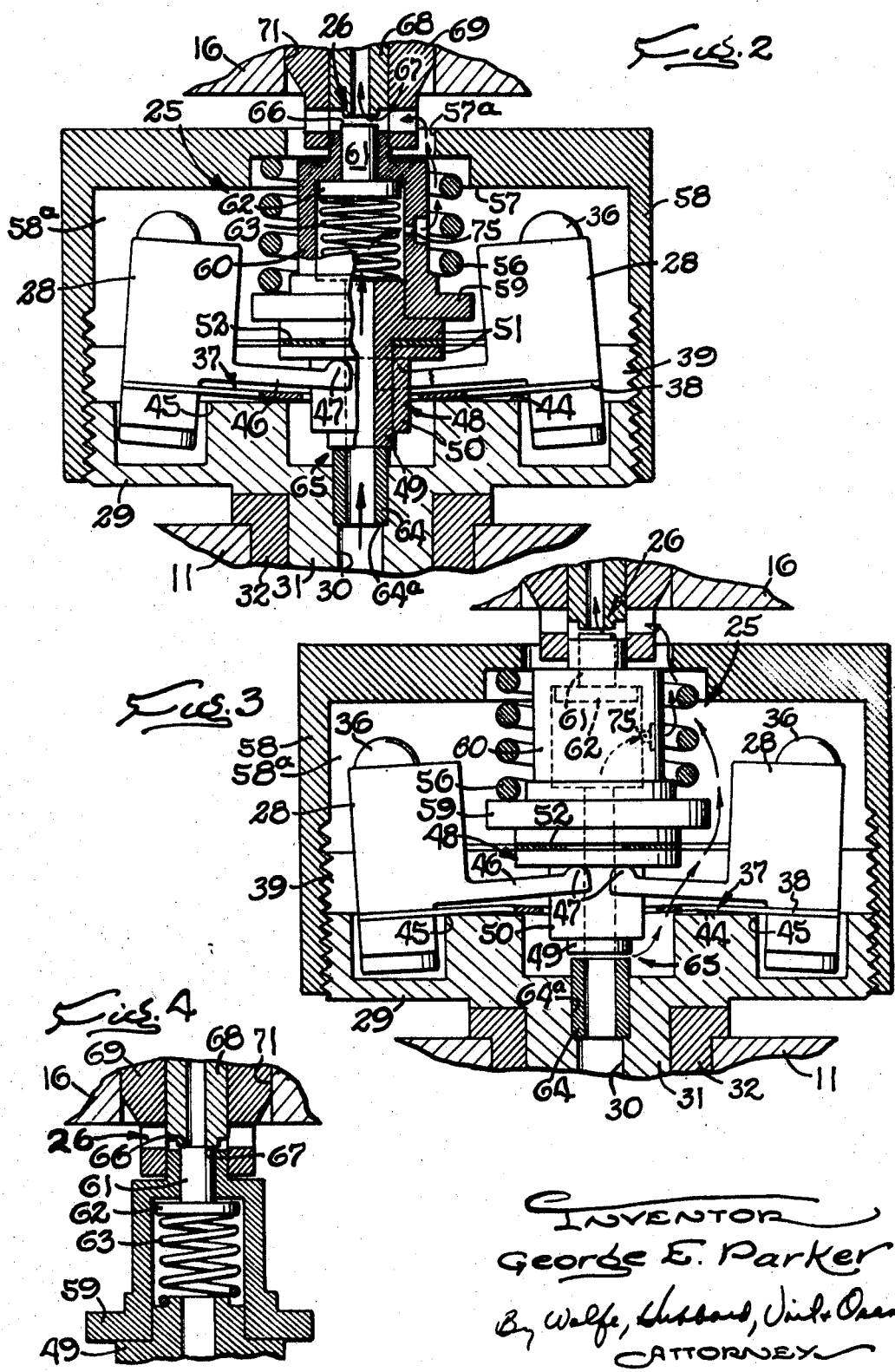

Sept. 30, 1969  G. E. PARKER  3,469,397
GAS TURBINE SPEED GOVERNOR WITH ACCELERATION FUEL SCHEDULE
Filed Jan. 12, 1968  3 Sheets-Sheet 3
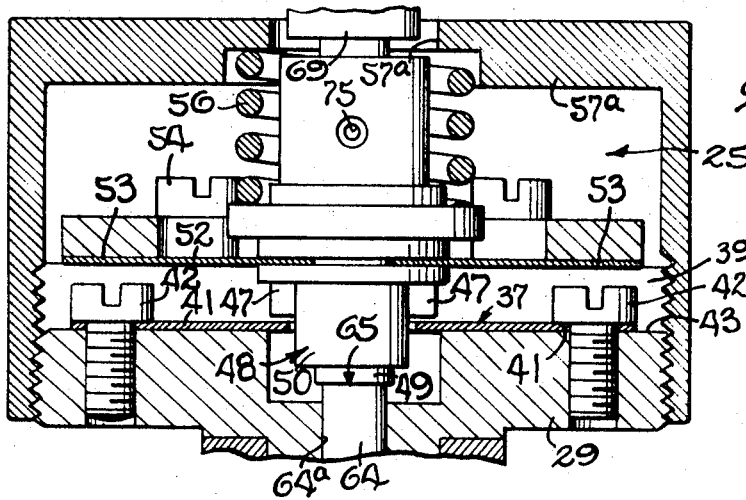
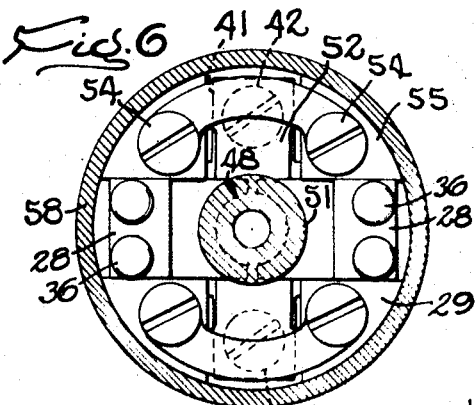
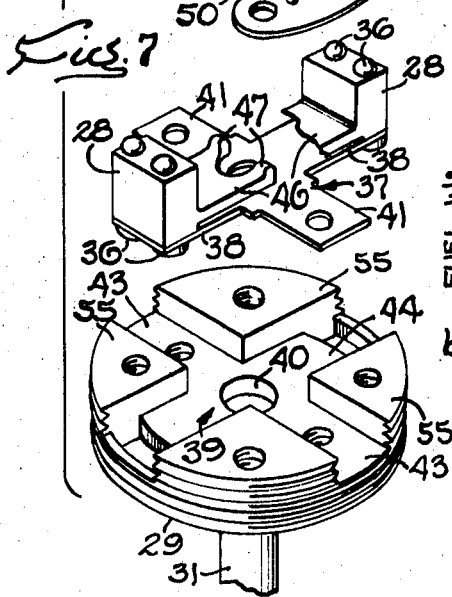
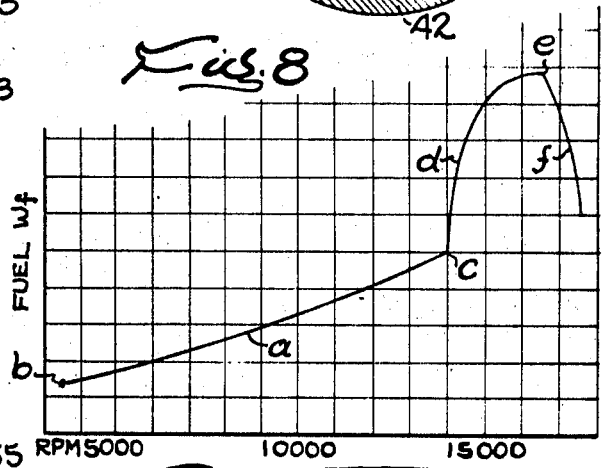
INVENTOR
George E. Parker
By [signature]
ATTORNEY United States Patent Office 3,469,397
Patented Sept. 30, 1969

3,469,397
GAS TURBINE SPEED GOVERNOR WITH ACCELERATION FUEL SCHEDULE
George E. Parker, Rockford, Ill., assignor to Woodward Governor Company, Rockford, Ill., a corporation of Illinois
Filed Jan. 12, 1968, Ser. No. 697,506
Int. Cl. F02c 9/10
U.S. Cl. 60—39.28                                                             11 Claims

ABSTRACT OF THE DISCLOSURE

During acceleration of the gas turbine, the fuel flow is scheduled in accordance with the increasing pressure of the compressor discharge and under the control of a speed sensor of the flyweight type which first limits the flow to a slow rate and then increases the flow rapidly to normal operating speed. Thereafter, the speed sensor coacts with a throttling valve to govern the flow and maintain an approximately constant turbine speed.

BACKGROUND OF THE INVENTION

This invention relates to a governor adapted to be driven by a gas turbine and operating to regulate the fuel flow thereto, the flow being limited by one or more operating conditions so as to avoid overheating of the turbine or stalling of the air compressor thereof. Heretofore, the fuel flow during acceleration has been controlled by a valve actuated bellows sensitive to compressor discharge pressure.

SUMMARY OF THE INVENTION

The primary objective of the present invention is to provide a new and improved system and method of the above character for regulating the flow of fuel to a gas turbine and involving the use of a speed sensor which, in addition to regulating the fuel flow and governing the turbine speed within a normal operating range, operates during starting and acceleration of the turbine to schedule the fuel increase at a low rate $a$ and in proportion to the increase in compressor discharge pressure and then, after the stall region of the compressor has been skirted at a speed $c$, to increase the flow in proportion to the discharge pressure increase but at a more rapid rate $d$ until the turbine has attained a normal operating speed $e$. The limited flow over the speed range $a$ is through a restricted passage by-passing the main passage through which the fuel flows during normal operation. The latter passage is opened progressively by the speed sensor as the turbine accelerates through the range $d$.

To accomplish the foregoing, the speed sensor actuates two valves which control the fuel flow through the main passage, one valve being held closed during the flow through the by-passage and until the turbine reaches the speed $c$ and being opened progressively as the turbine accelerates to the speed $e$. Thereafter, the other valve which is open throughout the ranges $a$ and $d$ becomes effective to throttle the flow through the main passage as the turbine speed changes under varying loads and thus act as a conventional speed governor in regulating the turbine speed.

The invention also resides in the novel construction and arrangement of the speed sensor and valves to form an inexpensive and compact governor of general utility for regulating fuel flow to a prime mover to control the speed thereof.

BRIEF DESCRIPTION OF THE DRAWINGS

FIGURE 1 is a diametrical sectional view taken on a vertical plane through a governor embodying the novel features of the present invention with connections to a gas turbine shown schematically.

FIGS. 2, 3 and 4 are similar but fragmentary views of portions of FIG. 1 showing different positions of the parts.

FIGS. 5 and 6 are fragmentary sections taken along the lines 5—5 nad 6—6 of FIG. 1.

FIG. 7 is an exploded perspective view of the governor flyweights and their mounting.

FIG. 8 is a chart showing the manner in which the fuel supply to the turbine varies with the turbine speed.

DESCRIPTION OF THE PREFERRED EMBODIMENT

In the drawings, the invention is shown incorporated in a speed governor for regulating the flow of fuel to a gas turbine 10 at normal operating speeds and loads but also to schedule and limit the fuel flowing during starting and acceleration of the turbine. The governor and the scheduling controls are built into a casing 11 containing the various fluid flow passages later described and adapted to be clamped against the end of the casing 12 of a pump 13 driven by the turbine and delivering fuel under relatively high pressure to the governor inlet passage 14. Fuel at the contemplated regulated rates is supplied to the turbine from an inlet 15 in a cover 16 fastened to and sealed around the top of the casing, the outlet being connected to the turbine burners 17 through a line 18. The outlet chamber 19 from the usual air compressor 21 driven by the turbine communicates with a conduit 22 with an inlet 23 in a cover 24ᵃ secured to the side of the casing 11.

Incorporated in the casing 11 in accordance with the present invention is a valve 24 actuated in response to changes in the discharge pressure from the turbine compressor to regulate the pressure within a supply chamber 20 and schedule the increase in fuel flow during acceleration of the turbine. During acceleration of the urbine, its speed is measured by a sensor 25 which coacts with the discharge pressure increase to cause the fuel flow to be increased first at the slow rate $a$ (FIG. 8) from a starting speed $b$ to a speed $c$ and then at the faster rate $d$ until normal operating speed is attained at $e$. During continued operation under varying loading of the turbine, the speed sensor 25 and a valve 26 act as a speed governor in regulating the fuel flow along the usual droop curve $f$. The sensor 25 continuously measures the turbine speed and preferably is of the flyweight type, herein comprising flyweights 28 upstanding from a ball head 29 having a depending tubular shaft 31 journaled in a bushing 32 pressed in a bore 33 in the lower part of the casing 11. Through a coupling 34, the ball head is driven from an extension 35 of one of the shafts of the pump 13 which is driven from the compressor shaft of the turbine. The supply chamber 20 communicates continuously through a groove 27 and ports 27ᵃ with the central bore 30 in the shaft 31 and closed at its lower end by a plug 30ᵃ.

To permit of high speed operation, for example 18,000 r.p.m., the flyweights 28 are pivotally mounted free of rubbing friction and for this purpose are secured by bolts 36 to the outer ends of arms 38 on a flat cross 37 (FIG. 7) of thin resilient metal seated in a correspondingly shaped recess 39 in the top of the ball head and having a center hole 40 therein. Transverse arms 41 of the cross are clamped by screws 42 (FIG. 6) against the bottom 43 of the recess so that the arms 38 project across and lie against flat bottom surfaces 44 terminating in outer edges 45. These provide fulcrums about which the flyweights swing at normal operating speeds by flexing of the arms 38 as illustrated in FIG. 3. The flyweight mounting shown forms the subject matter of my copending application Ser. No. 704,672, filed Feb. 12, 1968.

Projecting inwardly from the lower ends of and at right angles to the flyweights are toes 46 having ends 47 that bear upwardly against the outturned flange of a valve member 48 which, in the form shown, comprises inner and outer tubes 49 and 50 pressed together in telescoping relation and clamped by flanges 51 thereon against opposite sides of a diametrically extending strip 52 (FIG. 7) of resilient metal having ends 53 clamped by screws 54 (FIG. 6) to the flat surfaces 55 of the ball head. By flexing of the strip, the valve member 48 is thus adapted for axial shifting by the flyweights whose force, as applied through the toes, is balanced against the force of a speeder spring 56. The latter is of the compression type and coiled about the valve axis with its upper end abutting the apertured bottom 57 of an inverted cup 58 enclosing the flyweights and threaded at 58 onto the ball head.

At its lower end, the spring bears against an outturned flange 59 on the lower end of an inverted cup 60 pressed onto the upper end of the tube 49 so as to move with the valve member 48. For a purpose to appear later, the apertured bottom of the cup 60 is closed by a stem 61 projecting through the bottom of the cup and having a head 62 within the cup normally held against the bottom thereof by a light compression spring 63 abutting against the top of the valve member 48 (FIG. 1).

Pressed into the upper end of a central bore 64ª in the ball head shaft 31 is a bushing 64 whose upper end cooperates with the lower end of the valve sleeve 49 to form a valve 65 which remains closed as shown in FIGS. 1 and 2 under the force of the speeder spring 56 until the turbine has been accelerated to a speed $c$ (FIG. 8) determined by the force of this spring. As the speed increases above this value, the valve member 48 is lifted correspondingly thus increasing the opening of the valve 65 as shown in FIG. 3.

The main valve 26 of the governor which meters the fuel flow to regulate the speed of the loaded turbine as indicated at $f$ (FIG. 8) is formed herein by the upper end 66 of the stem 61 coacting with the lower end 67 of a bushing 68 pressed into and projecting from the lower end of a sleeve 69 held by seals in a bore 71 in the upper part 16 of the governor casing. The interior of the sleeve communicates with the fuel outlet 15 through holes 72 and a passage 73. The extent of opening of the valve 26 for any speed of the ball head, may be adjusted by turning a plug 74 threaded into the bore 71 and abutting the closed upper end of the sleeve 69.

It will be apparent from the foregoing that the valves 26 and 65 are connected in series in a flow passage which, when the valve 26 is open as shown in FIG. 3, regulates the fuel flow as indicated at $f$. This passage extends from the supply chamber 20 into the shaft 31, upwardly along the axial bore 30 thereof, through the valve 65 as indicated by the arrows in FIG. 3 and into the chamber 58ª defined by the ball head 29 and the inverted cup 58. From the opening 57ª in the upper end of the latter, the flow may continue through the throttling valve 26 into the bore of the stationary sleeve 68 and to the outlet 15 through the ports 72.

The present invention provides an alternative path for a restricted flow of fuel from the supply chamber 20 to the outlet 15 continuously while the valve 65 is closed as shown in FIGS. 1 and 2. This passage, which by-passes the valve 65, extends upwardly through the shaft bore 30, the valve bushing 64, and the valve members 48 into the cup 60 and then laterally through an orifice 75 in the side of the cup 60 and into the cup chamber 58ª. From the latter, the flow may continue upwardly through the end of the cup and laterally through the open throttling valve 26 into the sleeve 68 to the outlet 15. The orifice 75 is sized to properly restrict the flow as will appear later through this path which also extends along the ball head axis and through the bushing 64 of the valve 65 thus by-passing the latter so that the orifice path is open continuously.

As set forth above, an important aspect of the present invention is the manner of utilizing the discharge pressure from the compressor turbine to actuate the pressure regulating valve 24 and schedule the fuel flow from the supply chamber 20 through the by-passage including the orifice 75 during acceleration of the turbine to a speed $c$ above which the fuel flow is, by opening of the valve 65 by the speed sensor 25, increased rapidly without danger of overheating the turbine or stalling of its compressor. To this end, the valve 24 comprises a hollow plunger 76 slidable back and forth in a bore 77 in the casing 11 and cooperating at its inner end 78 with the end 79 of a bore 80 defining the chamber 20 to allow some of the fuel supplied by the pump 13 to escape to a groove 81 and flow through a passage 82 back to the fuel sump and pump inlet. The rate of such by-passing is determined by the difference between two pressures acting in opposite directions on an axially movable wall in the form of a piston 83 movable back and forth with the valve plunger 76 within a cylinder 84 in the casing and subjected at one end to the controlled pressure in the chamber 20 and at the other end to the air pressure of compressor discharge as transmitted through the inlet 23 to the outer end of the cylinder.

In the present instance, the piston is formed by disks 85 and 86 smaller than the cylinder and fixed to and axially spaced along a rod extension 87 of the valve plunger 76. Between the piston and the cylinder are seals in the form of diaphragms 88 and 89 whose outer peripheries are clamped by the cover 24ª against opposite ends of a ring 91 and end surfaces of the cover and casing 11. The center of the diaphragm 88 is clamped by a disk 92 against the disk 85 which is formed integral with the valve plunger and its stem 87. The disk 92 is loose on the stem and separated by a spacer 93 from a disk 94 against which the center of the diaphragm 89 is clamped by the disk 86 which is threaded onto the outer end of the stem. The space between the disks is vented through a groove 95 in the ring and reigstering holes 96 in the surrounding casing flange 97.

The pressure exerted on the disk 86 is supplemented by the force of a compression spring 98 acting between the disk and the head 99 of a screw 101 threaded through the cover 24 to permit the spring force to be adjusted. The piston cylinder is reduced in diameter at its inner end 101 which communicates continuously with the pressure chamber 20 through a bore 102 in the plunger and a hole 103 extending crosswise through the inner end thereof. A light compression spring 104 interposed between the disk 85 and the end of the cylinder 101 acts on the piston 83 in the initial assembly to hold the valve plunger 76 out of the bore 80 while the spring 98 is being adjusted.

The disk 86 defining the outer piston end is made somewhat larger in diameter than the inner disk 85, and the difference in the effective disk areas together with the force of the spring 98 enables the controlled pressure in the chamber 20 to be maintained at a value somewhat higher than the prevailing compressor discharge pressure.

By properly proportioning the sizes of the disks 85, 86 and adjusting the force of the spring 98, it will be apparent that the increase in the flow of fuel to the turbine during the acceleration $a$ (FIG. 8) thereof may be restricted in accordance with the desired schedule. In each instance, the flow rate is increased gradually as indicated by the slope of the acceleration curve $a$ and, at all speeds along the latter, is below the fuel rate that would be conducive to overheating of the turbine or stalling of its compressor. Thus, by selecting an orifice 75 of proper size, proportioning the sizes of the piston disks 85, 86, and properly adjusting the force of the spring 98, the rate of fuel increase may be tailored to the requirements of a given turbine.

The extent of the fuel restriction during the initial acceleration is determined by the speed sensor through the medium of the valve 65 which remains closed under the force of the speeder spring 56 until the turbine has accelerated to the speed $c$. As described above, this speed may be changed as desired by turning the cup 58 relative to the ball head 29 so as to impart to the spring 56 the force required for establishing the desired speed $c$. As the turbine speed increases above this speed, opening of the valve 65 by the speed sensor 25 is started and the continued fuel flow through the orifice 75 is supplemented by the greater rate of flow through the valve 65 and the throttling valve 26. The latter is then open far enough, due to proper adjustment of the plug 74, to permit the combined flows determined by the orifice 75 and the valve 65 to pass to the turbine. Accordingly, the increasing compressor discharge pressure causes the controlled pressure in the supply chamber 20 to be increased much more rapidly as indicated by the curve $d$ as soon as the valve 65 starts to open. Thus, the turbine is brought rapidly to the normal operating speed $e$. Then, the speed sensor becomes the primary control and its valve 26 throttles the fuel flow in response to increases in the turbine speed above the value $c$. Thus, the speed sensor and the valve 24 act as a conventional speed droop governor in regulating the fuel flow in response to load changes and along the curve $f$.

Within this speed range, the valve 26 will normally remain open. But, if an abnormal overspeed occurs for any reason, the end 66 of the stem 61 will be raised into abutment with the end 67 of the sleeve 68 as shown in FIG. 4. The valve 26 is thus closed and the fuel flow to the turbine is interrupted until the overspeed condition has been relieved and the stem 61 backed away from the sleeve end 67. The spring 63 allows the stem 61 to yield according to the extent of the overspeed but always maintains the stem positioned correctly (FIG. 3) for operation of the turbine at normal speeds.

It will be apparent from the foregoing that by extending the two flow paths from the stationary chamber 20 through bores in the ball head and its shaft 31 and extending along the axis thereof, optimum radial compactness is achieved in the governor. At the same time, the valves 26 and 65 may be of the type which contribute to low cost manufacture as well as radial compactness.

I claim:

1. The method of regulating the flow of fuel to a gas turbine having an air compressor and a fuel pump comprising the steps of sensing the speed of the turbine during acceleration and normal operation thereof, increasing the rate of flow of fuel to the turbine during acceleration to a predetermined speed in proportion to the increase in the discharge pressure from said compressor, increasing the fuel flow at a more rapid rate in proportion to said increase in compressor discharge pressure supplemented in proportion to increase in turbine speed during acceleration of the turbine from said predetermined speed to the speed range of normal operation, and thereafter regulating the fuel flow in accordance with changes in the turbine speed as the latter varies with changes in loading of the turbine.

2. The method as defined in claim 1 in which said predetermined speed is above the speed at which the turbine compressor is subject to stalling and the fuel flow at speeds below such predetermined speed is below the flow rate that would be conducive to stalling of the turbine compressor.

3. For regulating the flow of fuel to a gas turbine having an air compressor and a fuel pump, the combination of, a chamber supplied with fuel by said pump, a first valve for by-passing fuel out of said chamber, an actuator for said valve responsive to the pressure of the air discharged by said compressor and controlling the by-passing of fuel out of said chamber while increasing the chamber pressure in proportion to the compressor discharge pressure increase as the turbine is accelerated after starting, a main fuel supply passage extending from said chamber to the turbine supply outlet, a speed sensor driven by the turbine and incorporating a sensor for measuring turbine speed, a second valve in said passage maintained closed by said speed sensor at speeds below a predetermined first value and open above such speed, a third valve in said passage in series with said second valve held open by the sensor at speeds below a second value substantially higher than said first value but closed progressively by the sensor as the turbine speed increases above such second value, and means providing a passage by-passing said second valve and providing for a flow of fuel at a restricted rate from said chamber to said outlet.

4. A gas turbine fuel regulator as defined in claim 3 in which said by-pass valve actuator includes an axially movable piston having opposite ends respectively exposed to the pressure in said supply chamber and the pressure of the air discharged by said compressor.

5. A fuel regulator as defined in claim 3 in which said by-passing passage is open continuously.

6. A fuel regulator as defined in claim 3 in which said by-passing passage includes a flow restracting orifice determining the rate of fuel to the turbine during starting and acceleration thereof to said first speed value.

7. A gas turbine fuel regulator as defined in claim 4 in which the effective areas of said opposite piston ends are of different sizes and determine the rate of increase of said chamber pressure in relation to said compressor discharge pressure.

8. A gas turbine fuel regulator as defined in claim 7 in which opposite ends of said piston are enclosed axially spaced diaphragm seals and the space between the diaphragms is vented to the atmosphere.

9. A gas turbine fuel regulator as defined in claim 4 including a spring exerting on said piston a force which supplements the fluid pressure on one end thereof, the force of said spring being adjustable selectively.

10. A gas turbine fuel regulator as defined in claim 3 in which said speed sensor includes a rotary flyball head having a passage extending axially therethrough and forming part of said main fuel supply passage.

11. A gas turbine fuel regulator as defined in claim 10 in which the fuel by-passing passage is formed in part by the axial passages through said ball head.

References Cited

UNITED STATES PATENTS

| | | | |
|---|---|---|---|
| 3,105,354 | 10/1963 | McCombs | 60—39.28 |
| 3,195,308 | 7/1965 | McCombs | 60—39.28 |
| 3,208,218 | 9/1965 | Schelin | 60—39.28 |
| 3,220,184 | 11/1965 | Oprecht | 60—39.28 |
| 3,240,015 | 3/1966 | Cowles | 60—39.28 |

JULIUS E. WEST, Primary Examiner